US007019852B2

(12) United States Patent
Morikawa

(10) Patent No.: US 7,019,852 B2
(45) Date of Patent: Mar. 28, 2006

(54) IMAGE FORMING APPARATUS CAPABLE OF IMAGE FORMATION IN A PLURALITY OF MODES

(75) Inventor: Takeshi Morikawa, Okazaki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 08/941,459

(22) Filed: Sep. 30, 1997

(65) Prior Publication Data

US 2001/0012124 A1 Aug. 9, 2001

(30) Foreign Application Priority Data

Mar. 12, 1997 (JP) .................................. 9-057684

(51) Int. Cl.
G06F 15/00 (2006.01)

(52) U.S. Cl. .................... 358/1.13; 358/296; 358/1.14; 399/82; 399/376

(58) Field of Classification Search ................ 395/113, 395/109, 112, 115, 116; 358/296, 450, 453, 358/404, 444, 449, 448, 474, 1.13, 1.14; 399/11, 16, 17, 82, 85, 370, 376
See application file for complete search history.

(56) References Cited

U.S. PATENT DOCUMENTS

| 4,739,369 | A | | 4/1988 | Yoshiura et al. .......... 355/14 R |
|---|---|---|---|---|
| 4,864,350 | A | * | 9/1989 | Ishiguro et al. ............... 399/14 |
| 4,912,518 | A | * | 3/1990 | Matsuo et al. .............. 399/368 |
| 4,918,537 | A | * | 4/1990 | Mori et al. .................. 358/300 |
| 4,970,549 | A | | 11/1990 | Yoshizuka et al. .......... 355/209 |
| 5,008,709 | A | * | 4/1991 | Shinada et al. ............... 399/86 |
| 5,012,200 | A | * | 4/1991 | Tsutsumi et al. ........... 355/206 |
| 5,041,874 | A | * | 8/1991 | Nishimori et al. .......... 399/203 |
| 5,053,831 | A | * | 10/1991 | Ishiguro et al. ............. 355/324 |
| RE34,460 | E | * | 11/1993 | Ishiguro et al. .......... 270/58.15 |
| 5,265,209 | A | * | 11/1993 | Kageyama et al. .......... 358/1.2 |
| 5,270,779 | A | * | 12/1993 | Kawai .......................... 399/85 |
| 5,343,306 | A | * | 8/1994 | Oshita ........................ 358/441 |
| 5,383,754 | A | * | 1/1995 | Sumida et al. ................ 412/11 |
| 5,543,907 | A | * | 8/1996 | Kato et al. .................... 399/85 |
| 5,544,875 | A | * | 8/1996 | Obara ......................... 271/176 |
| 5,555,099 | A | * | 9/1996 | Telle .......................... 358/401 |
| 5,579,450 | A | * | 11/1996 | Hanyu et al. ............... 358/1.16 |
| 5,642,288 | A | * | 6/1997 | Leung et al. ................ 700/223 |
| 5,697,039 | A | * | 12/1997 | Nishimori et al. .......... 399/368 |
| 5,715,497 | A | * | 2/1998 | Ueda et al. ................... 399/17 |
| 5,722,029 | A | * | 2/1998 | Tomidokoro et al. ........ 399/389 |
| 5,722,031 | A | | 2/1998 | Fujii et al. .................. 399/410 |
| 5,825,988 | A | * | 10/1998 | Collard et al. ............. 358/1.13 |

(Continued)

FOREIGN PATENT DOCUMENTS

JP  61-275832 (A)  12/1986

(Continued)

*Primary Examiner*—Joseph R. Pokrzywa
(74) *Attorney, Agent, or Firm*—Sidley Austin Brown & Wood LLP

(57) ABSTRACT

A user-friendly, image forming apparatus capable of reducing operation errors by users provides a permission to change a print mode to the staple print mode when the device is placed in the original mixed mode and the image data of originals all have a same length in the main scanning direction. When the image data also have a same length in a subscanning direction, the apparatus provides a permission to change the current print mode to the economy print mode and the two-side print mode. Only a print mode which is permitted as an optional print mode is displayed on a screen on the liquid crystal touch panel.

15 Claims, 16 Drawing Sheets

U.S. PATENT DOCUMENTS 5,909,602 A * 6/1999 Nakai et al. .................... 399/8
5,930,006 A * 7/1999 Yoshida et al. ............. 358/450
5,987,171 A * 11/1999 Wang ......................... 382/173

FOREIGN PATENT DOCUMENTS

| JP | 62-072267 (A) | 4/1987 |
|---|---|---|
| JP | 02-146064 (A) | 6/1990 |
| JP | 2155368 | 6/1990 |
| JP | 3048572 | 3/1991 |
| JP | 3177987 | 5/1991 |
| JP | 05-083440 (A) | 4/1993 |
| JP | 5122477 | 5/1993 |
| JP | 06-046177 (A) | 2/1994 |
| JP | 06-191177 (A) | 7/1994 |
| JP | 06-237328 (A) | 8/1994 |
| JP | 07-273934 (A) | 10/1995 |
| JP | 07-303163 (A) | 11/1995 |
| JP | 08-062736 (A) | 3/1996 |
| JP | 08-223326 (A) | 8/1996 |
| JP | 08-258390 (A) | 10/1996 |

* cited by examiner

FIG. 1   1 DIGITAL COPYING MACHINE

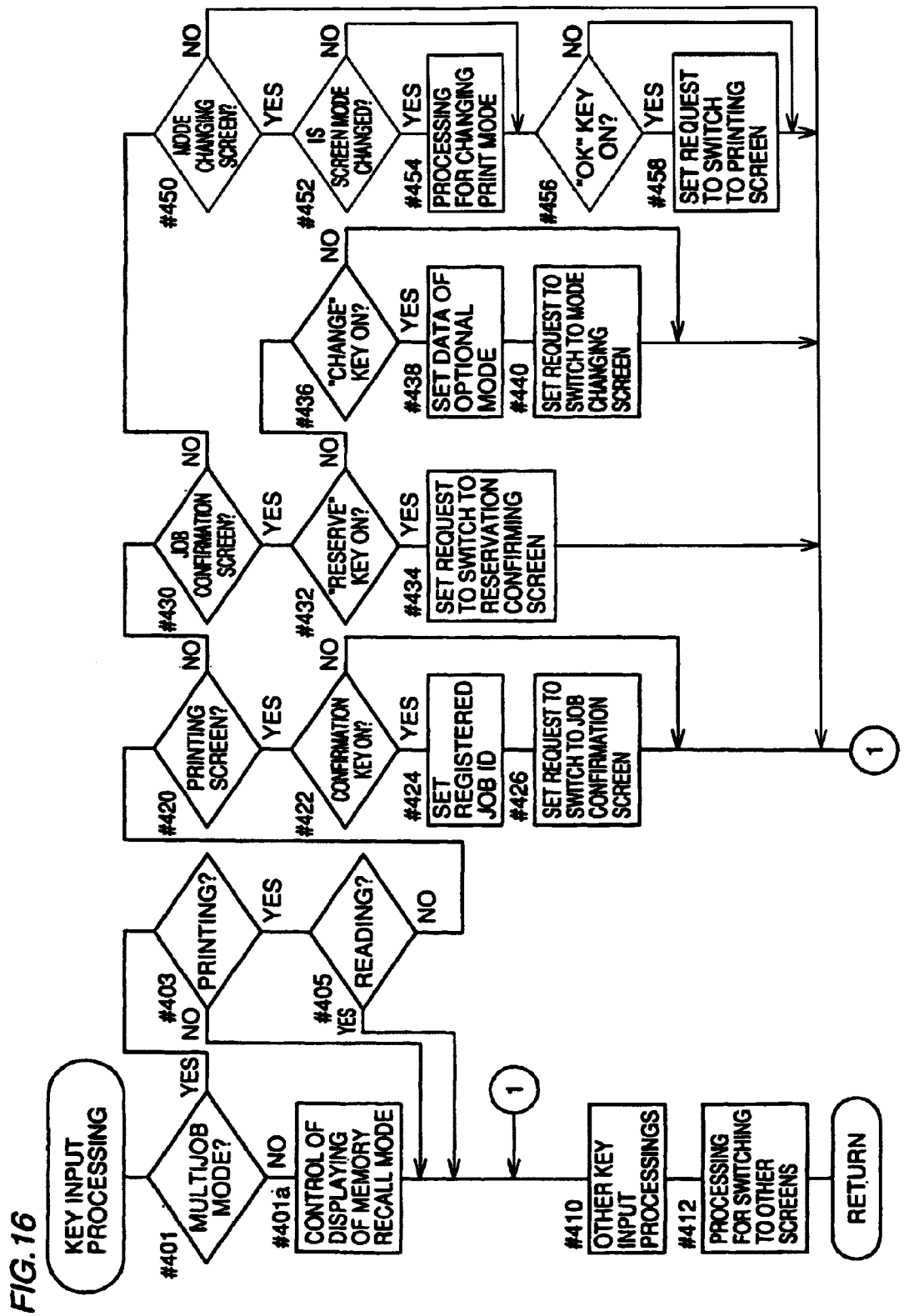

IMAGE FORMING APPARATUS CAPABLE OF IMAGE FORMATION IN A PLURALITY OF MODES

BACKGROUND OF THE INVENTION

1. Field of the Invention

The present invention relates to an image forming apparatus with an image memory, and particularly to an image forming apparatus capable of changing a print mode set depending on the frame size of image data for an image data registered in the image memory with a print mode set.

2. Description of the Related Art

In a digital copying machine, a plurality of sheets of originals are read, the image data of the plurality of sheets of the originals read are once stored in an image memory, and then the image data is read from memory for printing. Such conventional digital copying machines include a digital copying machine disclosed in Japanese Patent Laid-Open No. 5-122477.

Furthermore, conventional digital copying machines can provide; an economy copy for processing read image data to reduce and copy the images of a plurality of originals such that the images are arranged on the same side of one copying sheet; a two-side copy for copying the images of originals on the front and back sides of a copying sheet; and a staple copy for stapling at an end a plurality of copy sheets with the images of originals copied thereon.

In the economy copy, a digital copying machine reduces the images of a plurality of originals at the same reduction ratio and copies the images such that they are arranged on the same side of a copying sheet. Accordingly, it is preferable that each original, and more specifically the frame of each read image data, has the same size. In the two-side copy, a digital copying machine copies the images of originals on the front and back sides of one copying sheet. Accordingly, it is preferable that the image data of two originals copied on the front and back sides of a copying sheet have the same frame size. In the staple copy, a digital copying machine aligns a plurality of copying sheets discharged from the copying machine to be stapled such that the sheets match at their ends. Accordingly, it is preferable that a plurality of copying sheets to be stapled have the same size in the direction of the alignment, i.e., the image data stored in the image memory have the same frame size in the direction of the alignment.

This also applies to a printer which stores the image data of a plurality of frames (i.e., text data) into a memory and reads and prints the image data from the memory.

SUMMARY OF THE INVENTION

The present invention is made to address the foregoing, and one object of the present invention is to provide an image processing device and an image forming apparatus which reduces operation errors by users and is thus user-friendly.

Another object of the present invention is to provide a user-friendly image forming apparatus wherein, when printing cannot be performed in the staple print mode, a user will not select the staple print mode and operation errors by the user are thus reduced.

Still another object of the present invention is to provide a user-friendly image forming apparatus wherein, when printing cannot be performed in the two-side print mode, a user will not select the two-side print mode and operation errors by the user are thus reduced.

Still another object of the present invention is to provide a user-friendly image forming apparatus wherein, when printing cannot be performed in the economy print mode, a user will not select the economy print mode and operation errors by the user are thus reduced.

According to an aspect of the present invention in order to achieve the aforementioned objects, an image processing device operable in a plurality of modes of operation includes a memory for storing image data, a state decision unit for determining the state of the image data stored in the memory, a display for displaying the operating condition of the image processing device, and a display controller connected to the state decision unit for displaying an operable mode of operation of a plurality of modes of operation according to the state of the image data.

In the image processing device according to the present invention, an operable mode of operation is displayed on the display according to the state of image data. Thus, a user can immediately decide the mode of operation which is operable, and will not select an inoperable mode of operation. This reduces operation errors of the user and results in a user-friendly image processing device.

According to another aspect of the present invention, an image processing device operable in a plurality of modes of operation includes a memory for storing image data, a state decision unit for determining the state of the image data stored in the memory, an operation panel for selecting any of the plurality of modes of operation, and a selection prohibiting controller connected to the state decision unit for prohibiting selection of an inoperable mode of operation of the plurality of modes of operation through the operation panel according to the state of the image data.

In the image processing device according to the present invention, selection of an inoperable mode of operation is prohibited depending on the state of image data. Thus, a user will not select any inoperable mode of operation and this reduces operation errors by the user and results in a user-friendly image processing device.

In still another aspect of the present invention, an image forming apparatus operable in a plurality of print modes includes a memory for storing image data, a printer for reading the image data stored in the memory for each frame and for printing, a state decision unit for determining the state of the image data stored in the memory, a display for displaying the operating state of the image forming apparatus, and a display controller connected to the state decision unit for displaying an operable print mode of the plurality of print modes on the display according to the state of the image data.

In the image forming apparatus according to the present invention, an operable print mode is displayed on the display according to the state of image data. Thus, a user can immediately determine whether a print mode is operable and will not select an inoperable print mode. This reduces operation errors by the user and results in a user-friendly image forming apparatus.

Preferably, the state decision unit includes a frame-length decision unit for determining the frame length of image data in a predetermined direction.

Preferably, the image forming apparatus includes a finisher for stapling sheets printed in the printer, the frame-length decision unit includes a device for determining whether the image data stored in the memory all have a same frame length in the predetermined direction, and the display controller includes a device for displaying on the display the staple print mode for performing a staple processing by the finisher when it is determined that the image data stored in the memory all have a same frame length in the predetermined direction.

In the image forming apparatus according to the present invention, whether or not printing in the staple print mode can be provided is determined depending on the frame length of image data in a predetermined direction. When printing can be provided in the staple print mode, the print mode is displayed on the display. Thus, a user can immediately determine whether printing can be provided in the staple print mode, and will not select the staple print mode when printing cannot be provided in the print mode. This reduces operation errors by the user and results in a user-friendly image forming apparatus.

Preferably, the state decision unit includes a frame-size decision unit for determining the frame size of image data.

Preferably, the frame-size decision unit includes a device for determining whether the image data stored in the memory all have a same frame size, and the display controller includes a device for displaying on the display the two-side print mode for printing image data on the both sides of a sheet when the image data stored in the memory are determined as all having a same frame size.

In the image forming apparatus according to the present invention, whether or not printing can be provided in the two-side print mode is determined depending on the frame size of image data. When printing can be provided in the two-side print mode, the print mode is displayed on the display. Thus, a user will not select the two-side print mode when printing cannot be provided in the print mode. This reduces operation errors by the user and results in a user-friendly image forming apparatus.

Preferably, the frame-size decision unit includes a device for determining whether the image data stored in the memory all have a same frame size, and the display controller includes a device for displaying on the display the economy mode for printing image data of a plurality of frames on one side of a sheet when the image data stored in the memory are determined as all having a same frame size.

In the image forming apparatus according to the present invention, when printing in the economy print mode can be provided depending on the frame size of image data, the print mode is displayed on the display. Thus, a user can immediately determine whether printing can be provided in the economy print mode, and will not select the economy print mode when printing cannot be provided in the print mode. This reduces operation errors by the user and results in a user-friendly image forming apparatus.

In still another aspect of the present invention, an image forming apparatus operable in a plurality of print modes includes a memory for storing image data, a printer for reading the image data stored in the memory for each frame and for printing, a state decision unit for determining the state of the image data stored in the memory, an operation panel for selecting any of the plurality of print modes, and a selection prohibiting controller connected to the state decision unit for prohibiting selection of any inoperable print modes of the plurality of print modes through the operation panel according to the state of the image data.

In the image forming apparatus according to the present invention, selection of any inoperable print mode is prohibited depending on the state of image data. Thus, a user will not select any inoperable print mode. This reduces operation errors by the user and results in a user-friendly image forming apparatus.

Preferably, the image forming apparatus includes a finisher for stapling sheets printed in the printer, the state decision unit includes a device for determining whether the image data stored in the memory have different frame sizes, and the selection prohibiting controller includes a device for prohibiting the staple print mode for providing a staple processing by the finisher from being selected through the operation panel when the image data stored in the memory are determined as having different frame sizes.

In the image forming apparatus according to the present invention, selecting the staple print mode is prohibited depending on the frame size of image data. Thus, a user will not select the staple print mode when printing cannot be provided in the print mode. This reduces operation errors by the user and results in a user-friendly image forming apparatus.

Preferably, the state decision unit includes a device for determining whether the image data in the memory have different frame sizes, and the selection prohibiting controller includes a device for prohibiting selecting through the operation panel the two-side print mode for printing image data on the both sides of a sheet when the image data in the memory are determined as having different sizes.

In the image forming apparatus according to the present invention, selecting the two-side print mode is prohibited depending on the frame size of image data. Thus, a user will not select the two-side print mode when printing cannot be provided in the print mode. This reduces operation errors by the user and results in a user-friendly image forming apparatus.

Preferably, the state decision unit includes a device for determining whether the image data stored in the memory all have a same frame size, and the selection prohibiting controller includes a device for prohibiting selecting through the operation panel the economy print mode for printing the image data of a plurality of frames on one side of a sheet when the image data stored in the memory are determined as all having a same frame size.

In the image forming apparatus according to the present invention, selecting the economy print mode is prohibited depending on the frame size of image data. Thus, a user will not select the economy print mode when printing cannot be provided in the print mode. This reduces operation errors by the user and results in a user-friendly image forming apparatus.

In still another aspect of the present invention, an image forming apparatus operable in a plurality of print modes includes a memory for storing a print job including image data of not less than one frame, a print job selecting unit for selecting one of the print jobs stored in the memory, a state decision unit for determining the state of the image data included in a print job selected at the print job selecting unit, a printer for printing the image data included in the print job selected at the print job selecting unit, a display for displaying the operating state of the image forming apparatus, and a display controller connected to the state decision unit for displaying on the display an operable print mode of the plurality of print modes depending on the state of image data.

In the image forming apparatus according to the present invention, an operable print mode is displayed on the display depending on the state of image data. Thus, a user can immediately determine whether a print mode is operable and will not select any inoperable print modes. This reduces operation errors by the user and results in a user-friendly image forming apparatus.

In still another aspect of the present invention, an image forming apparatus operable in a plurality of print modes includes a memory for storing a print job including image data of not less than one frame, a print job selecting unit for selecting one of the print jobs stored in the memory, a state decision unit for determining the state of the image data included in a print job selected at the print job selecting unit, a printer for printing the image data included in the print job selected at the print job selecting unit, an operation panel for selecting any of the plurality of print modes, and a selection prohibiting controller connected to the state decision unit for prohibiting selecting through the operation panel an inoperable print mode of the plurality of print modes depending on the state of the image data included in a print job.

In the image forming apparatus according to the present invention, selecting an inoperable print mode is prohibited depending on the state of image data. Thus, a user will not select any inoperable print modes. This reduces operation errors by the user and results in a user-friendly image forming apparatus.

The foregoing and other objects, features, aspects and advantages of the present invention will be more apparent from the following detailed description of the present invention when taken in conjunction with the accompanying drawings.

BRIEF DESCRIPTION OF THE DRAWINGS

FIG. 16 is a flow chart of a subroutine of the key input processing.

DESCRIPTION OF THE PREFERRED EMBODIMENTS

Figure 1:
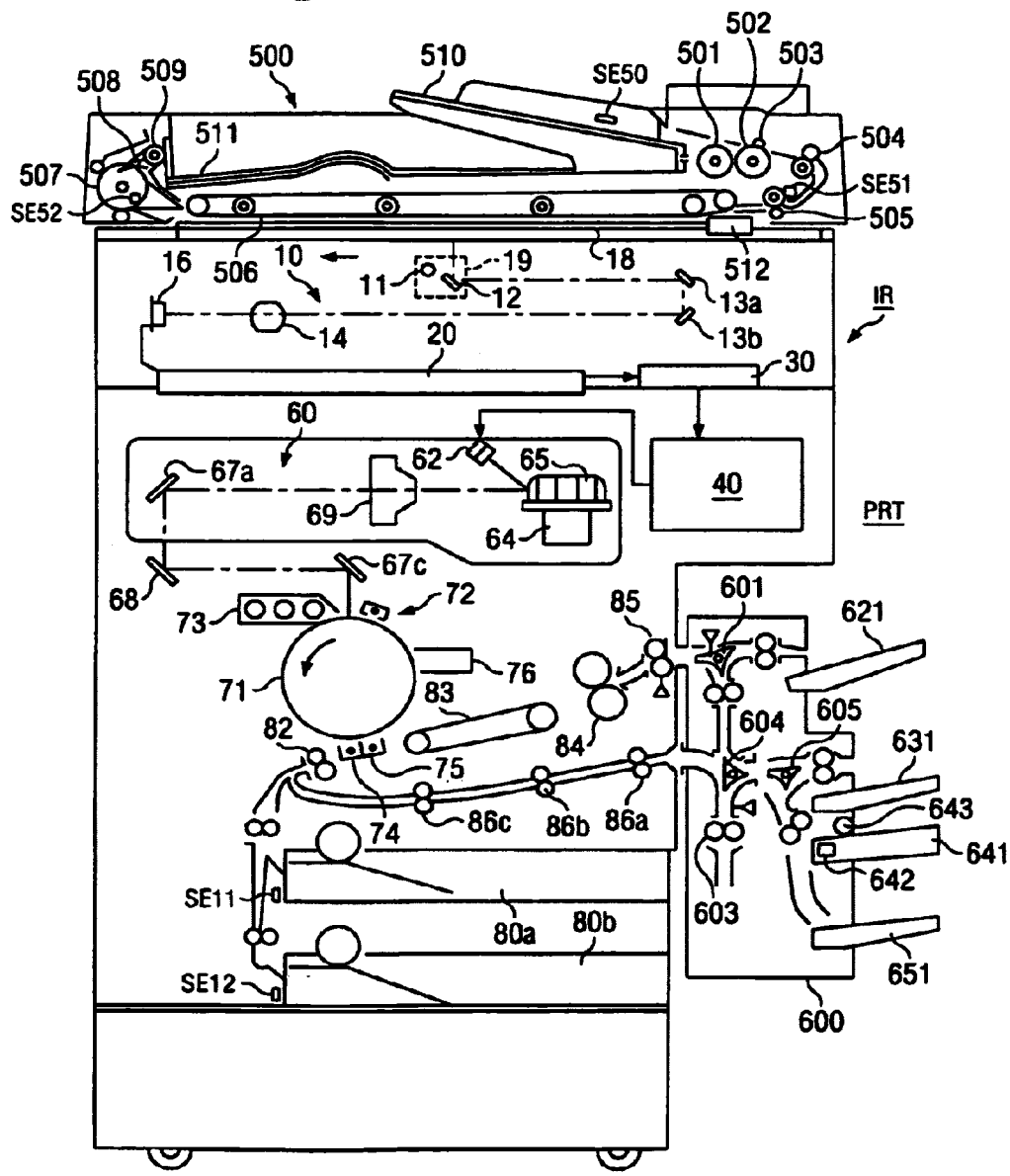
FIG. 1 is a cross sectional view of the entire configuration of a copying machine according to a first embodiment of the present invention.

Referring to FIG. 1, a digital copying machine 1 as one embodiment of the present invention includes an image reader IR, a printer PRT, and an operation panel OP (shown in FIG. 2) mounted to an upper portion of the body.

Image reader IR includes: a scan system 10 for scanning to read an original placed on an original supporting glass 18; an image signal processing unit 20 for processing an image signal for an image obtained by reading the original; a memory unit 30 for storing as image data the image signal for the image of the original processed by image signal processing unit 20; and an automatic document feeder 500 pivotably mounted on upper side of image reader IR with a back side thereof as a fulcrum.

Scan system 10 is a line scanning, image reading mechanism, in which scanner 19 provided with an original illuminating lamp 11 and a mirror 12 is moved for scanning in the direction indicated by the arrow in the figure to successively illuminate an image plane of an original placed on original supporting glass 18 and the reflected light is projected onto an image sensor 16 via fixed mirrors 13a and 13b and projection lens 14. Image sensor 16 is a line sensor having a plurality of photoelectric conversion elements arranged in a line, and each photoelectric conversion element (i.e., pixel) outputs an image signal depending on the quantity of light received.

Image signal processing unit 20 converts the image signal output from each photoelectric conversion element into a digital signal for various signal processings. Memory unit 30 stores the digital signal as image data. Image signal processing unit 20 and memory unit 30 will be detailed later.

Original transport device 500 includes a sheet feeding roller 501, a sorting roller 502, a sorting pad 503, an intermediate roller 504, a registering roller 505, a transport belt 506, a reversing roller 507, a switching claw 508, a sheet feeding roller 509, an original stacker 510, an original discharging tray 511, an original scale 512, an original sensor SE50 for detecting whether an original is present, an original size sensor SE51 and a discharge sensor SE52.

In automatic document feeder 500, an original set on original stacker 510 is transported by sheet feeding roller 501, sorting roller 502, sorting pad 503, intermediate roller 504, registering roller 505 and transport belt 506 onto original supporting glass 18. Furthermore, in automatic document feeder 500, a read original is discharged by transport belt 506 and discharging roller 509 onto original discharging tray 511.

In copying a plurality of originals, for example, an operator sets the originals by stacking them on original stacker 510 which their front sides facing upward. The originals on original stacker 510 are successively drawn one by one from the bottom original and precisely set at the reading position on original supporting glass 18 with the front sides facing downward. For a one-side original, which has an image only on one side thereof, when image reader IR has finished reading the original, the original is transported in the left direction in FIG. 1 and discharged onto original discharging tray 511 with the front side facing upward. For a two-side original, which has images on the both sides thereof, an original transported in the left direction after image reader IR has finished reading the front side is turned over by reversing roller 507 and returned to the reading position on original supporting glass 18. Then, the original has its back side read and is then again transported in the left direction and discharged onto original discharging tray 511.

Printer PRT prints an image of an original on a copying sheet by an electrophotography process based on image data transferred from image reader IR.

An operation of printer PRT will now be described. Printing processing unit 40 reads image data from memory unit 30 and provides the image data to a print head 60. In print head 60, a semiconductor laser 62 is driven according to the image data and a laser beam is modulated according to the image data is emitted. The laser beam is deflected by a polygon mirror 65, which is rotated by motor 64, and guided onto an exposure position on a photoreceptor drum 71 via a lens 69 and various mirrors 67a, 68 and 67c.

Photoreceptor drum 71 is carried such that it can be rotatably driven in the counterclockwise direction in the figure. As photoreceptor drum 71 rotates in such a manner, the electrophotography process is performed. More specifically, photoreceptor drum 71 has its surface uniformly charged by means of a corona charger 72, and has the exposure position exposed to the aforementioned laser beam. The exposure to the laser beam allows the formation of an electrostatic latent image corresponding to an image of an original on photoreceptor drum 71. The electrostatic latent image is developed by a developing device 73 to provide a toner image which is transferred at a transfer position by a transfer charger 74 from photoreceptor drum 71 to a copying sheet. After the toner image is transferred, the residual toner on photoreceptor drum 71 is collected by a cleaning device 76.

Copying sheets are housed in cassettes 80a and 80b depending on the size. The copying sheets are successively sent out one by one by a sheet feeding roller provided at an upper portion of each cassette, and transported to the transfer position via a timing roller 82 for transfer of a toner image. Then, the copying sheet with the toner image transferred thereon is separated from photoreceptor drum 71 by a separation charger 75 and sent to a fixing roller 84 by a transport belt 83. After the toner image is fixed on the copying sheet, the sheet is discharged by a discharging roller 85 to the outside of the machine.

It should be noted that the sizes of copying sheets housed in cassettes 80a and 80b are detected by sheet-size detection sensors SE11 and SE12, respectively.

The printing sheets discharged to the outside of the machine are transported to a finisher 600, which has switching claws 601, 604 and 605 operating depending on the copy mode to guide the copying sheets to discharging tray 621 or 631 or a stapling tray 641.

When the staple print mode is set, finished copying sheets are guided to and temporarily stored on stapling tray 641. When all of the copying sheets are stored, they are stapled by staple unit 642 and the set of the stapled copying sheets is discharged onto discharging tray 651 via transport roller 643.

When the two-side print mode is set, a copying sheet is switched back by transport roller 603 and again sent into the machine. The copying sheet is transported via transport roller 86a, 86b, and 86c to the transfer position for copying on the back side.

The aforementioned digital copying machine 1 is operable in various print modes. Operations of digital copying machine 1 in the various print modes will now be described.

In the one-side print mode, digital copying machine 1 successively copies images read from originals on one side of copying sheets.

In the two-side print mode, digital copying machine 1 successively copies images read from originals on the front and back sides of copying sheets.

The economy print mode includes the 2-in-1 mode and the 4-in-1 mode. In the 2-in-1 mode, digital copying machine 1 copies read originals with two of them arranged on one side of one copying sheet. In the 4-in-1 mode, digital copying machine 1 copies read originals with four of them arranged on one side of one copying sheet.

In the staple print mode, digital copying machine 1 staples finished copying sheets on stapling tray 641, as described above.

An operation of copying machine 1 will now be described with reference to FIGS. 2–4.

Figure 2:
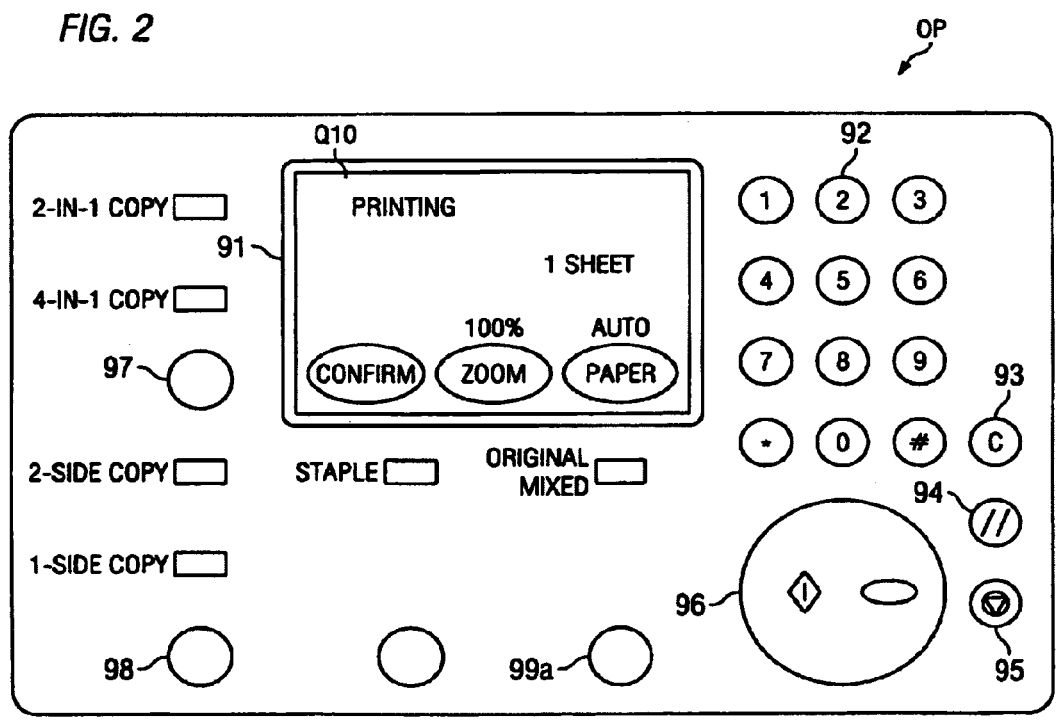
FIG. 2 is a front view of an operation panel of the copying machine according to the first embodiment of the present invention.

Referring to FIG. 2, a liquid crystal touch panel 91 is provided at the center of operation panel OP. Liquid crystal touch panel 91 displays the state of digital copying machine 1 as well as displays various touch keys for inputting copying conditions so that inputs by an operator are accepted via the touch keys. Provided on the right side of liquid crystal touch panel 91 are a ten-key keypad 92 for inputting numerical conditions, e.g., copying magnification and the number of sheets to be copied, and a clear key 93 for returning a numerical condition to a standard value. Provided thereunder are a panel reset key 94 for initializing various print modes, a stop key 95 for providing a direction that copying is stopped, and a start key 96 for providing a direction that copying is started.

Operation panel OP further includes: an economy-copy designating key 97 for alternately selecting setting the 2-in-1 mode, setting the 4-in-1 mode and canceling the economy mode each time it is pressed; a one-side/two-side selecting key 98 for alternately selecting setting the two-side print mode and setting the one-side print mode each time it is pressed; a finishing key for alternately selecting setting the staple mode and canceling the staple mode each time it is pressed; and an original key 99a for alternately selecting setting the original mixed mode and setting the original non-mixed mode each time when it is pressed.

The original mixed mode is set by an operator when at least one of a plurality of originals is different in size from the other originals in copying the plurality of originals through a series of copying operations (a job) successively performed in response to one direction that copying is started. The original non-mixed mode is set by an operator when a plurality of originals have a same size in copying all the originals through one job. It should be noted that the originals placed on original stacker 510 of automatic document feeder 500 are all copied in a series of copying operations. Thus, an operator sets the original mixed mode when he or she sets on original stacker 510 a plurality of originals having different sizes mixed, and sets the original non-mixed mode when he or she sets originals having a same size.

Furthermore, the present digital copying machine 1 is set in one of the multijob mode and the memory recall mode by means of a dip switch DP (not shown) provided in digital copying machine 1.

When the multijob mode is set, digital copying machine 1 can use memory unit 30 to simultaneously process a plurality of jobs in parallel. More specifically, one job is comprised of the operation for reading an original and the operation for printing the read image data. Thus, storing the image data of a read original into the memory allows an operator to execute the reading of the group of other originals and store the image data into memory unit 30 while digital copying machine 1 reads the image data of the original from memory unit 30 and prints it. Although memory unit 30 has a capacity sufficient to store image data of a plurality of jobs, the image data of originals which have been printed are successively erased from memory unit 30 so that a large number of jobs are stored.

When the memory recall mode is set, digital copying machine 1 does not erase from memory unit 30 the image data of a job which has been printed unless any specific command is issued. This allows an operator to again read from memory unit 30 the image data which has been printed and print it. In this printing, the operator can change the previous print mode. For example, a copying is initially performed in the two-side print mode and then the print mode can be changed to the 2-in-1 mode for another copying. Since the image data within memory unit 30 is not erased and thus held in the memory recall mode after printing is completed, it is difficult that digital copying machine 1 stores the image data of other jobs. Thus, digital copying machine 1 cannot provide the simultaneous, parallel processing of a plurality of jobs, which can be provided in the multijob mode, in the memory recall mode.

The displaying manner and inputting operation on liquid crystal touch panel 91 in the multijob mode will now be described with reference to FIGS. 2–3.

Figure 3A:
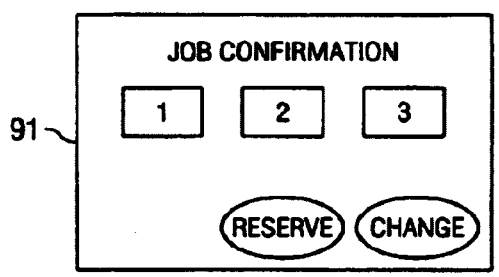
FIGS. 3(A)–3(C) show an example of screens on a liquid crystal touch panel.
Figure 3C:
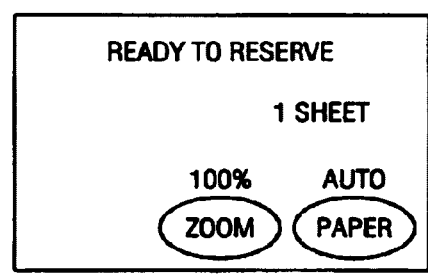

A screen Q10 is displayed on liquid crystal touch panel 91, as shown in FIG. 2, while image data is read from memory 30 and being printed. When an operator presses a touch key "CONFIRM" displayed on screen Q10, a job confirmation screen shown in FIG. 3(A) is displayed. The job confirmation screen informs the operator of any job registered in memory unit other 30 than the job being currently printed by displaying the job ID number for identifying the registered job. The example shown in FIG. 3(A) shows the condition that three jobs with job ID Nos. 1, 2 and 3 are registered in memory unit 30 and wait for being printed. When a touch key "RESERVE" on the job confirmation screen is pressed, a reservation screen appears as shown in FIG. 3(C). The reservation screen displays a touch key for setting a copying condition for a new job. When an operator sets a copying condition on the screen and presses start key 96, a new job is added to the job being currently printed and the three jobs Nos. 1-3 waiting for being printed and an original of the new job is read.

Figure 3B:
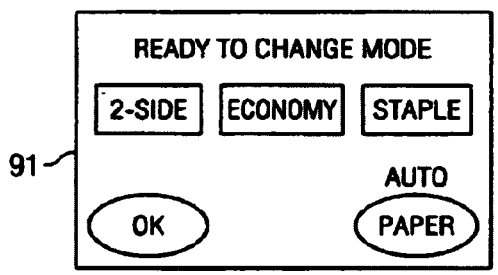

When any of the jobs waiting for being printed is designated on the job confirmation screen shown in FIG. 3(A) and a touch key "CHANGE" is then pressed, such a mode changing screen as shown in FIG. 3(B) appears. The mode changing screen displays an optional print mode for the designated job waiting for being printed. The example shown in FIG. 3(B) shows that the two-side print mode, the economy print mode and the staple print mode are available. Any of the displayed print modes touched by the operator is set as the print mode for the designated job. It should be noted that an optional mode is automatically determined and displayed depending on the frame size of the image data included in a designated job, which processing will be detailed later. When the operator presses a touch key "OK" on the mode changing screen, the screen returns to screen Q10 shown in FIG. 2.

The displaying manner and inputting operation on liquid crystal touch panel 91 in the memory recall mode will now be described with reference to FIG. 4.

Figure 4A:
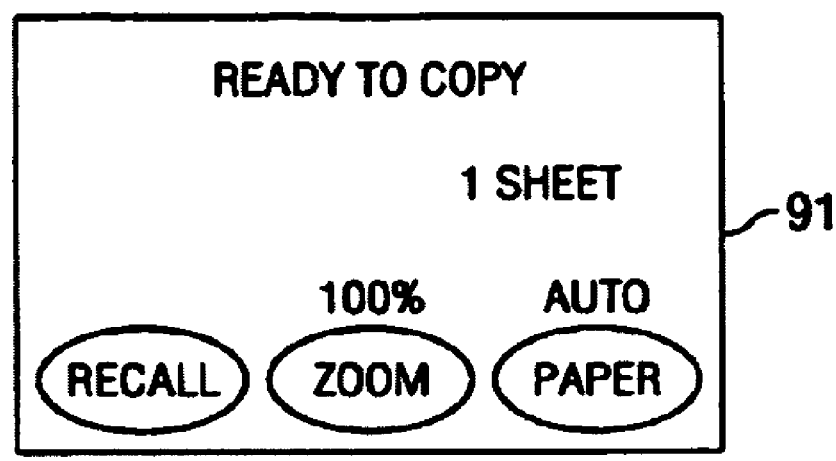
FIGS. 4(A)–4(B) show an example of screens on the liquid crystal touch panel.
Figure 4B:
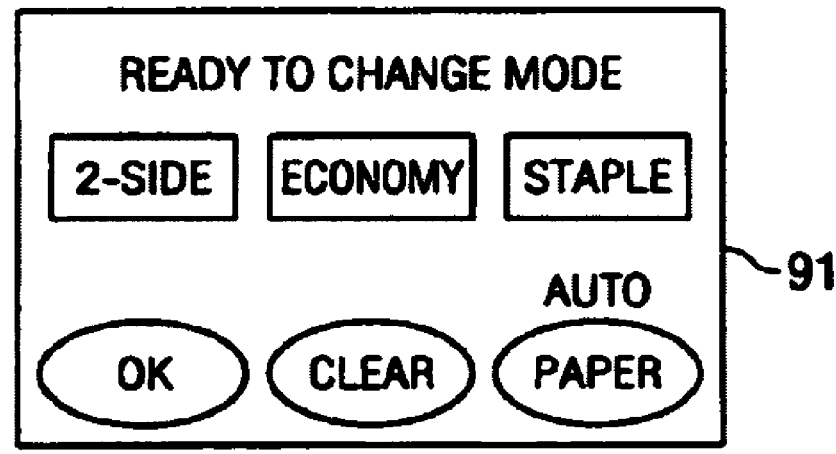

When the memory recall mode is set and a printing of a job is completed, liquid crystal touch panel 91 displays a copy standby screen indicating that copying is in a standby state, as shown in FIG. 4(A). When the operator presses a touch key "RECALL" on liquid crystal touch panel 91, the screen for changing the memory recall mode appears as shown in FIG. 4(B). The screen for changing the memory recall mode displays any optional print modes for the image data held in memory unit 30 after printing of the image data is completed. The example shown in FIG. 4(B) indicates that the two-side print mode, the economy print mode and the staple print mode are available. Any of the displayed print modes touched by the operator are set as the print mode for the job which has been printed. When the operator then presses start key 96, digital copying machine 1 again reads the image data stored in memory unit 30 and prints the data in the selected print mode. It should be noted that an optional print mode is automatically determined and displayed depending on the frame size of the image data included in a designated job, which processing will be detailed later. When a touch key "OK" is pressed on the screen for changing the memory recall mode, the screen is returned to screen Q10 shown in FIG. 2. When a touch key "CLEAR" is pressed on the screen for changing the memory recall mode, the image data stored in memory unit 30 is erased after the image data has been printed, and a new original reading is allowed.

In order to start to read a new original immediately after a printing of a job is completed, the operator sets the mode for the next job without pressing the "RECALL" key on the copy standby screen and then presses start key 96. The reading of the original is thus started.

Figure 5:
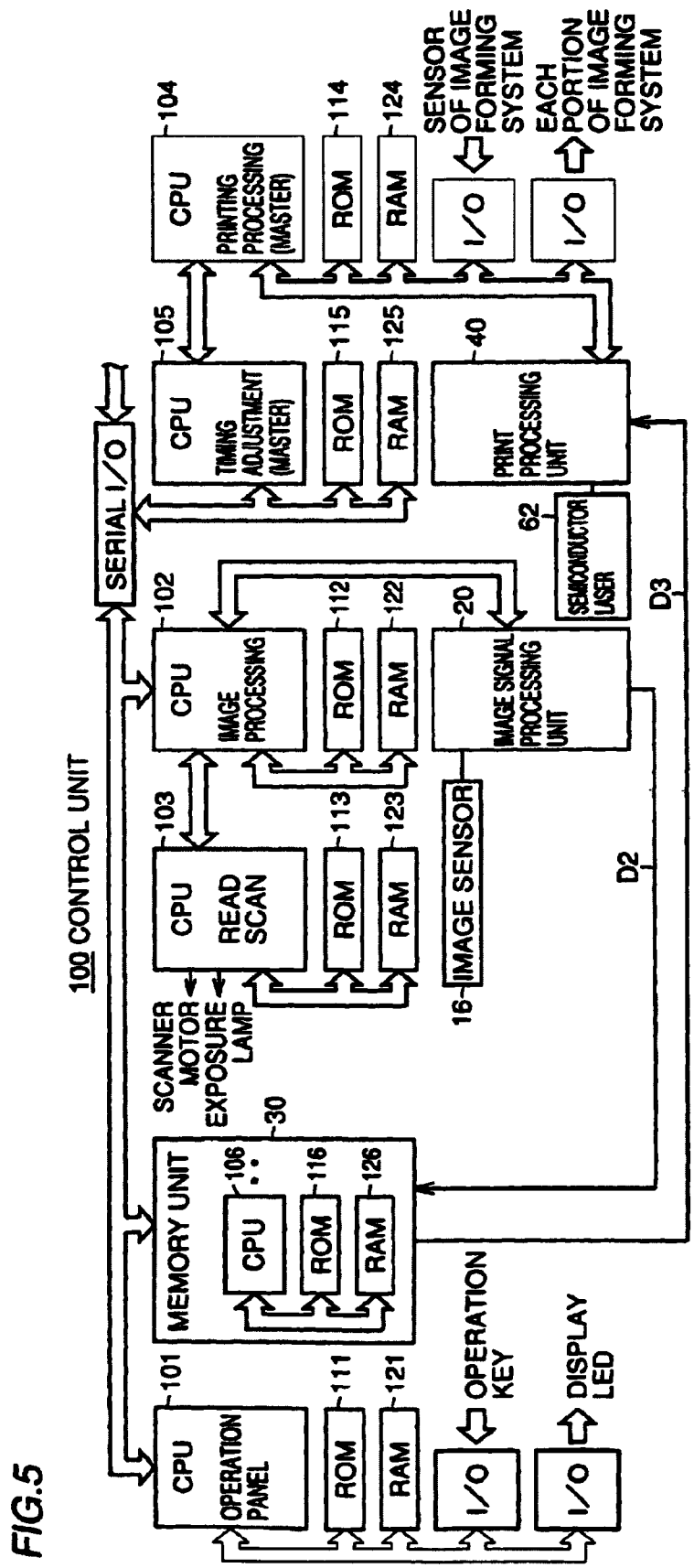
FIG. 5 is a block diagram showing a configuration of the control unit of the copying machine.
Figure 6:
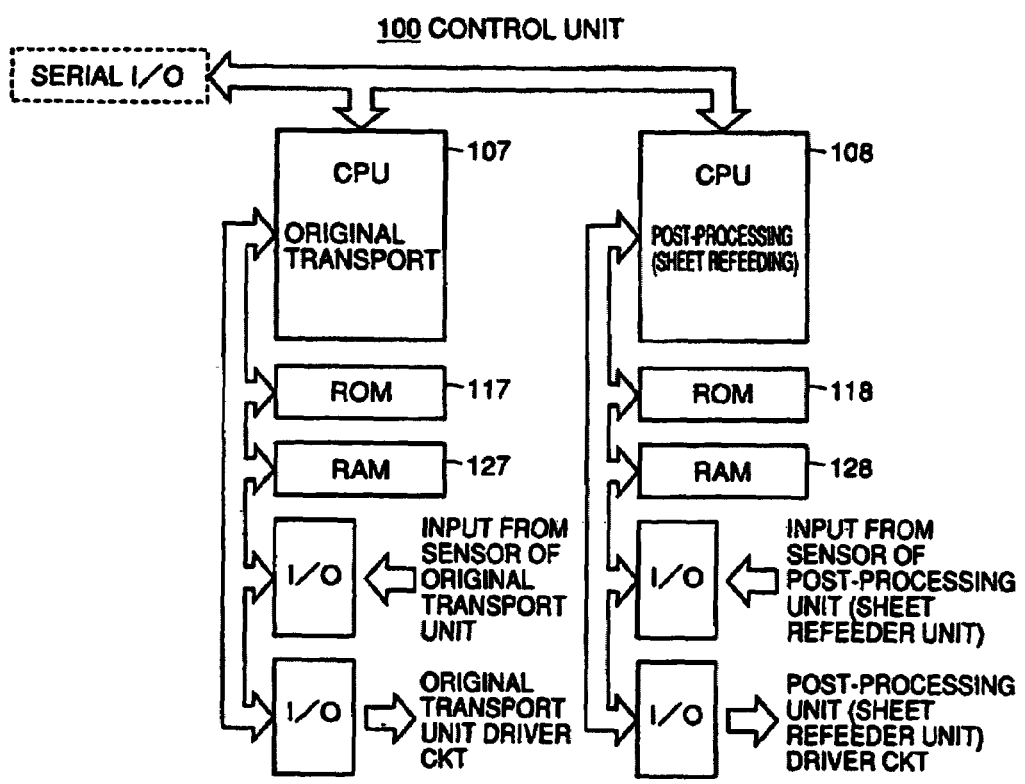
FIG. 6 is a block diagram showing a configuration of the control unit of the copying machine.

A control unit 100 for providing various controls of copying machine 1 will now be described with reference to FIGS. 5 and 6. Control unit 100 includes eight CPUs (Central Processing Units) 101–108, ROMs (Read Only Memories) 111–118 for storing programs performed in CPUs 101–108, respectively, and RAMs (Random Access Memories) 121–128 for storing parameters and the like. CPU 106 is provided within memory unit 30.

CPU 101 controls signal inputs from various operation keys on operation panel OP as well as displaying on operation panel OP. CPU 102 controls various portions of image signal processing unit 20. CPU 103 controls the driving of scan system 10. CPU 104 controls printer PRT including printing processing unit 40. CPU 105 provides the general timing adjustment for control unit 100 and a processing for setting modes of operation. Thus, CPU 105 performs serial communication with the other CPUs to transmit and receive commands and reports required for control. CPU 106 controls the storing and reading of image data. CPU 107 controls the transporting of originals by automatic document feeder 500. CPU 108 controls finisher 600.

Figure 7:
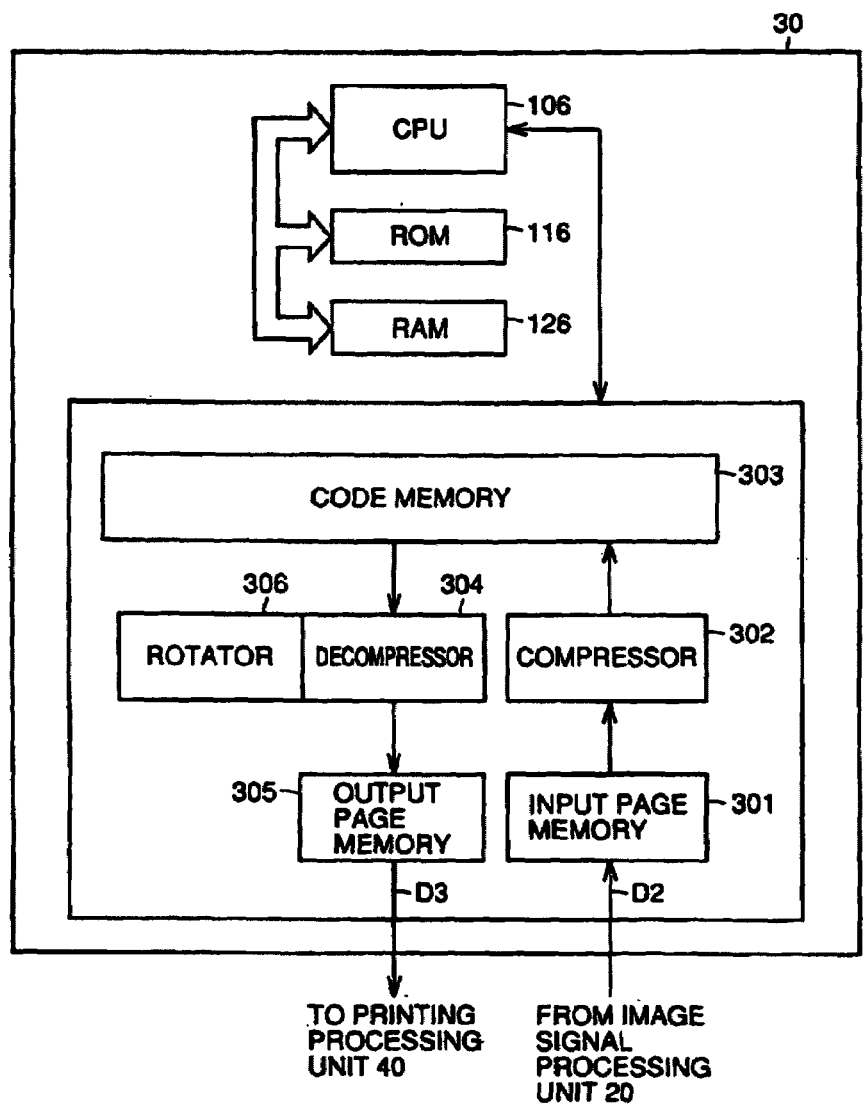
FIG. 7 is a block diagram showing a configuration of the memory unit.

Referring to FIG. 7, memory unit 30 includes an input page memory 301, a compressor 302, a code memory 303, a decompressor 304, an output page memory 305, a rotator 306, CPU 106, ROM 116 and RAM 126.

In reading an original, image data D2 read by image reader IR is transferred to input page memory 301, compressed by compressor 302 for each page and transferred to code memory 303.

In printing, compressed image data stored in code memory 303 is decompressed by decompressor 304. If image rotation is required, rotation processing is provided in the decompression by rotator 306 for each page.

The decompressed image data is transferred to output page memory 305 which transfers image data D3 to printing processing unit 40. The image transfers indicated by the arrows in the figure are independent from one another and can be operated in parallel to improve copying speed. Each image data is DMA-transferred by a DMA controller (not shown).

CPU 106 controls memory unit 30 according to a program stored in ROM 116. RAM 126 stores a parameter and the like required for operating the program.

Code memory 303 for temporarily storing image data of an original is managed by a management table provided within RAM 126.

Figure 8:
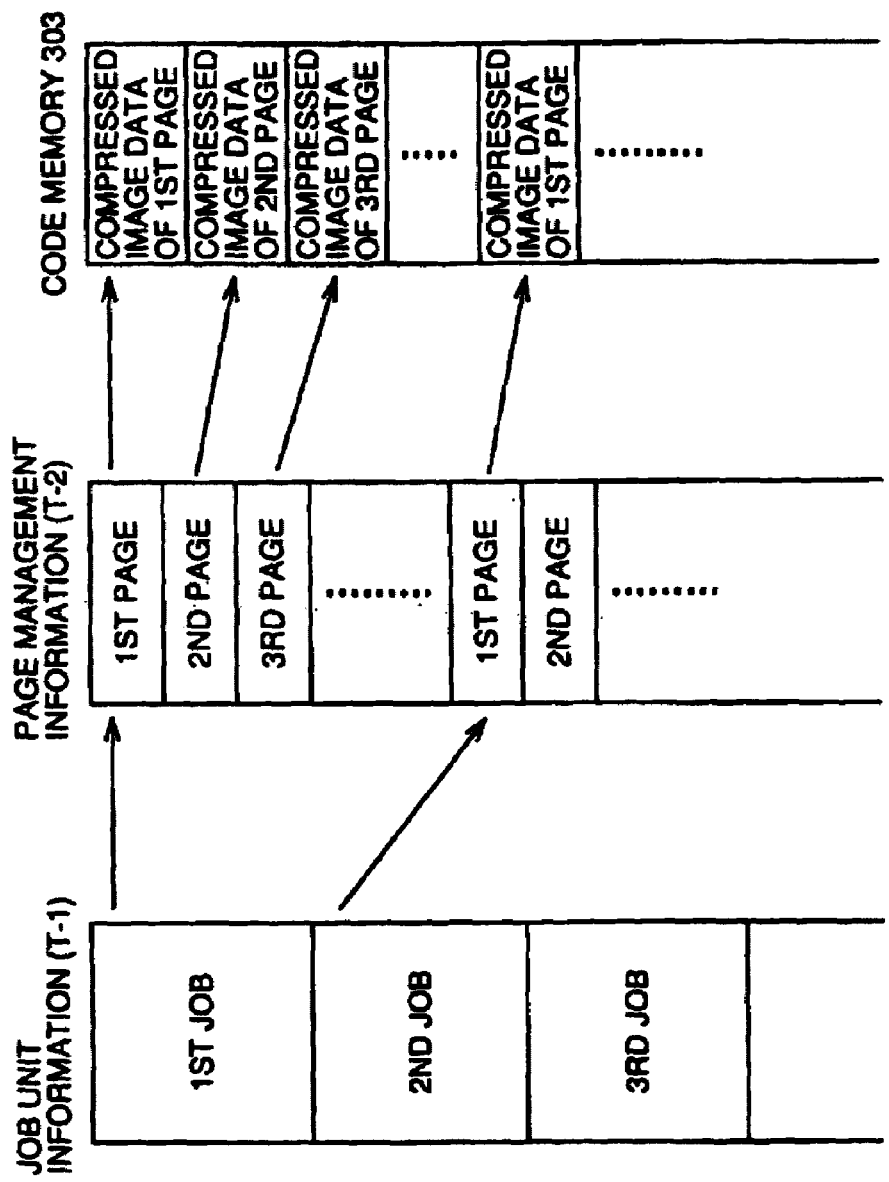
FIG. 8 schematically shows a management table illustrating a relation between jobs and the code memory.

The management table will now be described with reference to FIG. 8. Image data which is compressed after an original is read is managed for each print job. One job stores a plurality of pages which are divided. Thus, the management table includes a page management information table (T-2) for storing the divided information for each page and a job management information table (T-1) for storing the information for each job.

The job management information table (T-1) stores a job ID number, the registration state of the job, the storing location in the page management information table corresponding to the job, and the number of copies to be made, the set print mode and any optional print mode for the job, and the like. The page management information table (T-2) stores the length in the main scanning direction and the length in a subscanning direction of the image data frame of a read original, and the storing location of compressed image data.

It should be noted that the registration state of a job stored in the job management information table (T-1) is the information indicating the read state of a job, i.e., whether the reading of an original is completed.

In reading an original according to a direction from CPU 105, CPU 106 reads image data from input page memory 301 while forming information for the management table. CPU 106 also controls compressor 302 to store compressed image data into code memory 303.

In printing image data, CPU 106 refers to the information in the management table to read the compressed image data from code memory 303. In erasing the information in the management table, the multijob mode and the memory recall mode are different from each other as follows:

(1) in the multijob mode, the information of interest in the management table is erased when compressed image data has been read based on the information of the page of interest and printed by the number of sheets and the number of copies designated by an operator; and (2) in the memory recall mode, the information of interest in the management table is erased when an operator presses the "CLEAR" key on the screen for changing the memory recall mode shown in FIG. 4B displayed on liquid crystal touch panel 91 and a direction that a job is cleared or a direction that a new original is read is provided.

Figure 9:
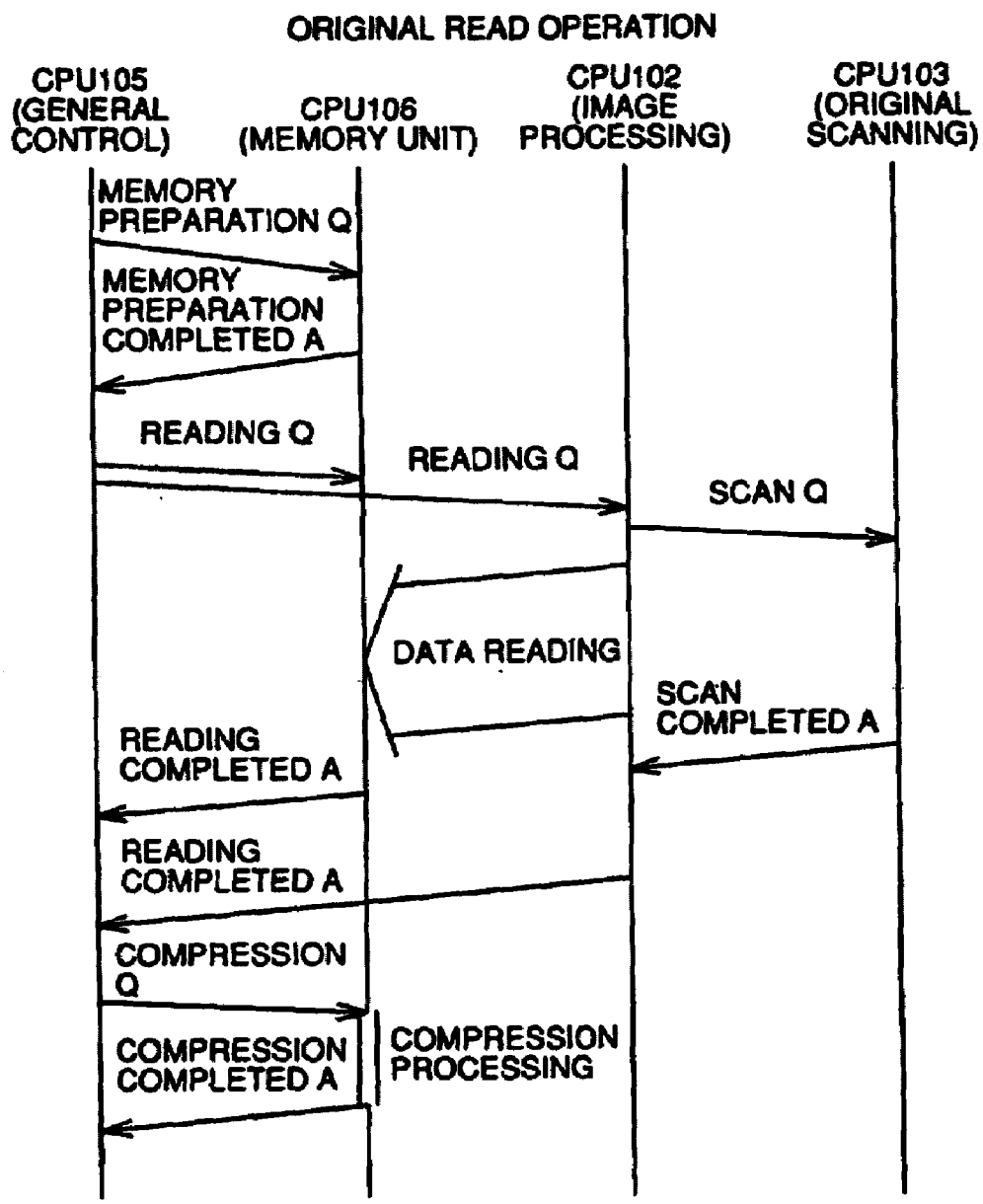
FIG. 9 schematically shows a sequence of the original reading operation.
Figure 10:
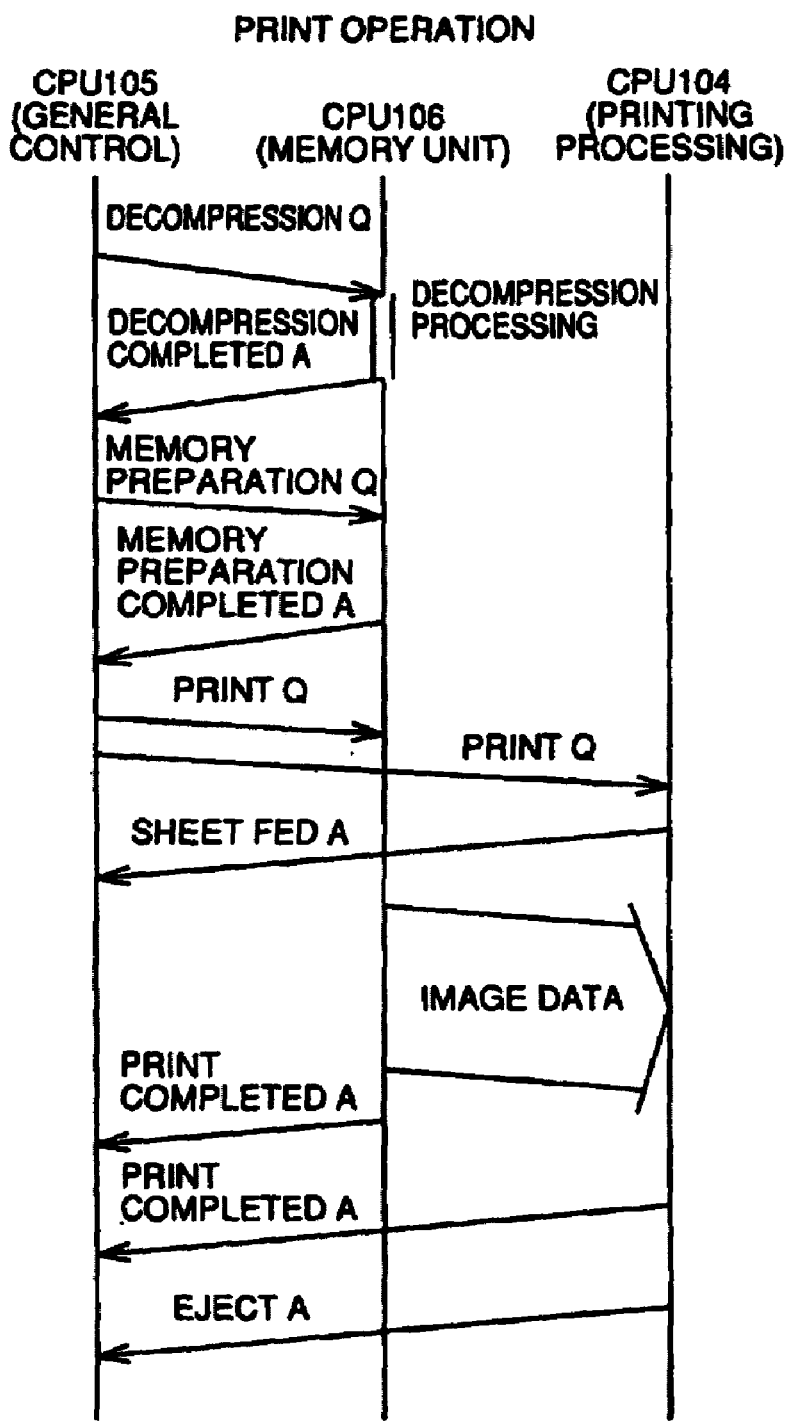
FIG. 10 schematically shows a sequence of a printing operation.

Referring to FIGS. 9 and 10, an operation sequence of digital copying machine 1 in original reading and printing will now be described mainly with respect to request commands (Q) reporting signals (A) and a stream of image data among CPUs 101–106.

Referring to FIG. 9, in the original reading operation, read image data is transferred from image signal processing unit 20 to memory unit 30.

First, CPU 105, which controls the general sequence, issues a memory preparation command to CPU 106. Responsively, CPU 106 sets for an internal hardware a bus connection state for transferring image data D2 from image signal processing unit 20 to memory unit 30. When the setting is completed and the preparation is completed, CPU 106 transmits to CPU 105 a signal for reporting the memory preparation has been completed.

When CPU 105 issues a read command to CPUs 106 and 102, CPU 102 issues a scan command to CPU 103.

CPU 103 starts scanning. When scanner 19 reaches an image region, read data (image data D2) is transferred from image signal processing unit 20 to memory unit 30 according to an image processing mode set by CPU 102.

When the scanning is completed and CPU 102 and CPU 106 transmit a signal for reporting that a reading has been completed, CPU 105 issues a data compression command to CPU 106. CPU 106 responsively initiates various portions, e.g., input page memory 301, compressor 302 and code memory 303. This allows the compression processing and coded data (compressed image data) is stored in code memory 303. When the compression processing is completed, CPU 106 notifies CPU 105 that a compression has been completed by means of a signal for reporting that a compression has been completed.

Referring to FIG. 10, in the printing operation, image data is read from code memory 303 and a copied image is printed on a copying sheet according to the image data.

First, CPU 105 issues to CPU 106 a decompression command to request data decompression. CPU 106 initiates various portions, e.g., code memory 303, decompressor 304, rotator 306 and output page memory 305. A decompression processing is thus performed an image data is written to output page memory 305.

When the decompression processing is completed, CPU 106 transmits to CPU 105 a signal for reporting that the decompression has been completed.

CPU 105 issues to CPU 106 a memory preparation command for reading the image data from output page memory 305. Responsively CPU 106 sets for the internal hardware the bus connection state, rotation processing and the like for outputting image data D3 from output page memory 305 to printing processing unit 40.

When the aforementioned setting is completed and CPU 105 receives a signal for reporting that the memory preparation has been completed, CPU 105 issues a print command to CPUs 106 and 104. CPU 104 sends to CPU 105 a sheet-feeding reporting signal for informing CPU 105 of the transport state of a copying sheet. Then, image data D3 read from input page memory 305 is output to printing processing unit 40 and printing is performed.

When the printing is completed, CPU 106 transmits to CPU 105 a signal for reporting that the printing has been completed. CPU 104 transmits to CPU 105 a signal for reporting that the printing has been completed and a signal for reporting that an eject has been completed. When CPU 105 receives these reports in the multijob mode, CPU 105 issues a memory clear command to CPU 106 and erases the image data which has been printed.

Referring to the flow charts shown in FIGS. 11–16, an operation of digital copying machine 1 will now be more specifically described mainly with respect to a control characterized according to the present invention.

A flow of a processing by CPU 101, which is responsible for control of operation panel OP, will now be described with reference to FIG. 11. Upon power-on, CPU 101 first initializes RAM 121, a register and the like (#11). Then, CPU 101 repeatedly performs the setting of an internal timer which defines the length of one routine (#12), the key input processing for accepting key operations (#13), the panel display processing for providing displayings according to operations (#14), other processings (#15) and the decision-making on whether the internal timer has expired (#16). Also, CPU 101 appropriately provides interruption for communication with the other CPUs.

Figure 12:
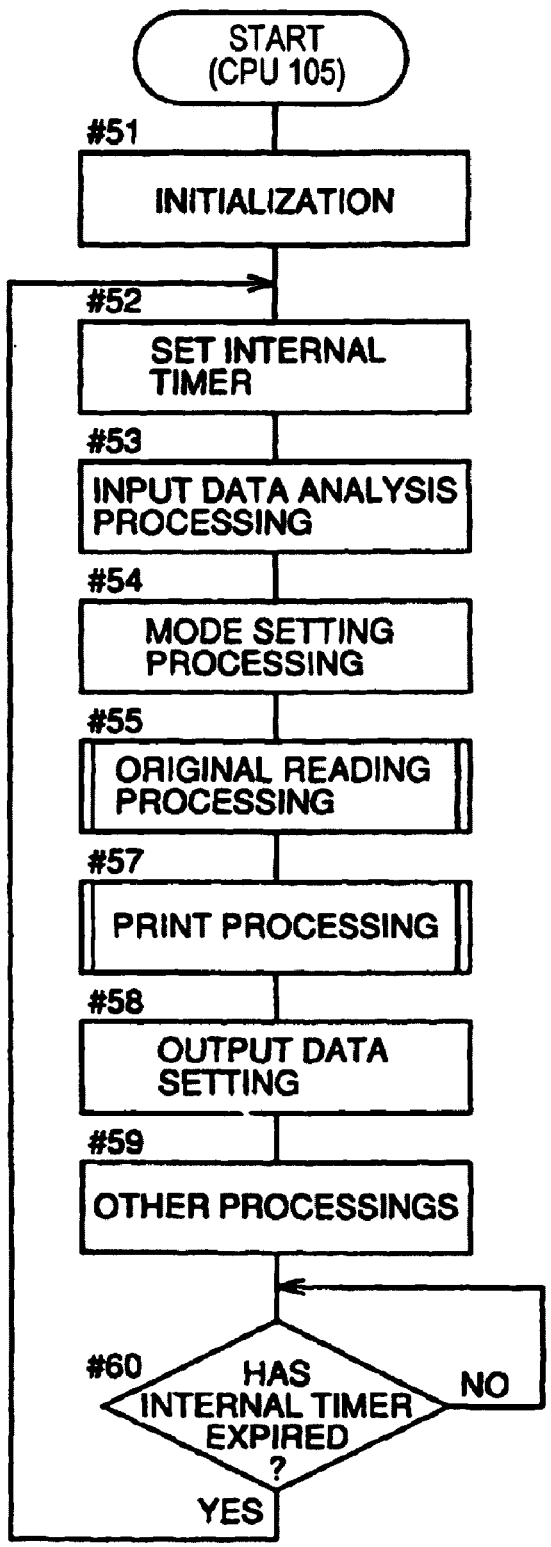
FIG. 12 is a flow chart of the main routine of CPU 105.

Referring to FIG. 12, CPU 105, which directs the control of digital copying machine 1, provides initialization (#51), and then repeated performs starting an internal timer (#52), the input data analysis processing for checking input data from the other CPUs (#53), the mode setting processing for setting a mode of operation according to the content of a setting on the operation panel (#54), the original reading processing (#55), the print processing (#57), the output data setting for allowing a command to standby at a communication port (#58), other processings (#59) and the decision-making on whether the internal timer has expired (#60).

Figure 13:
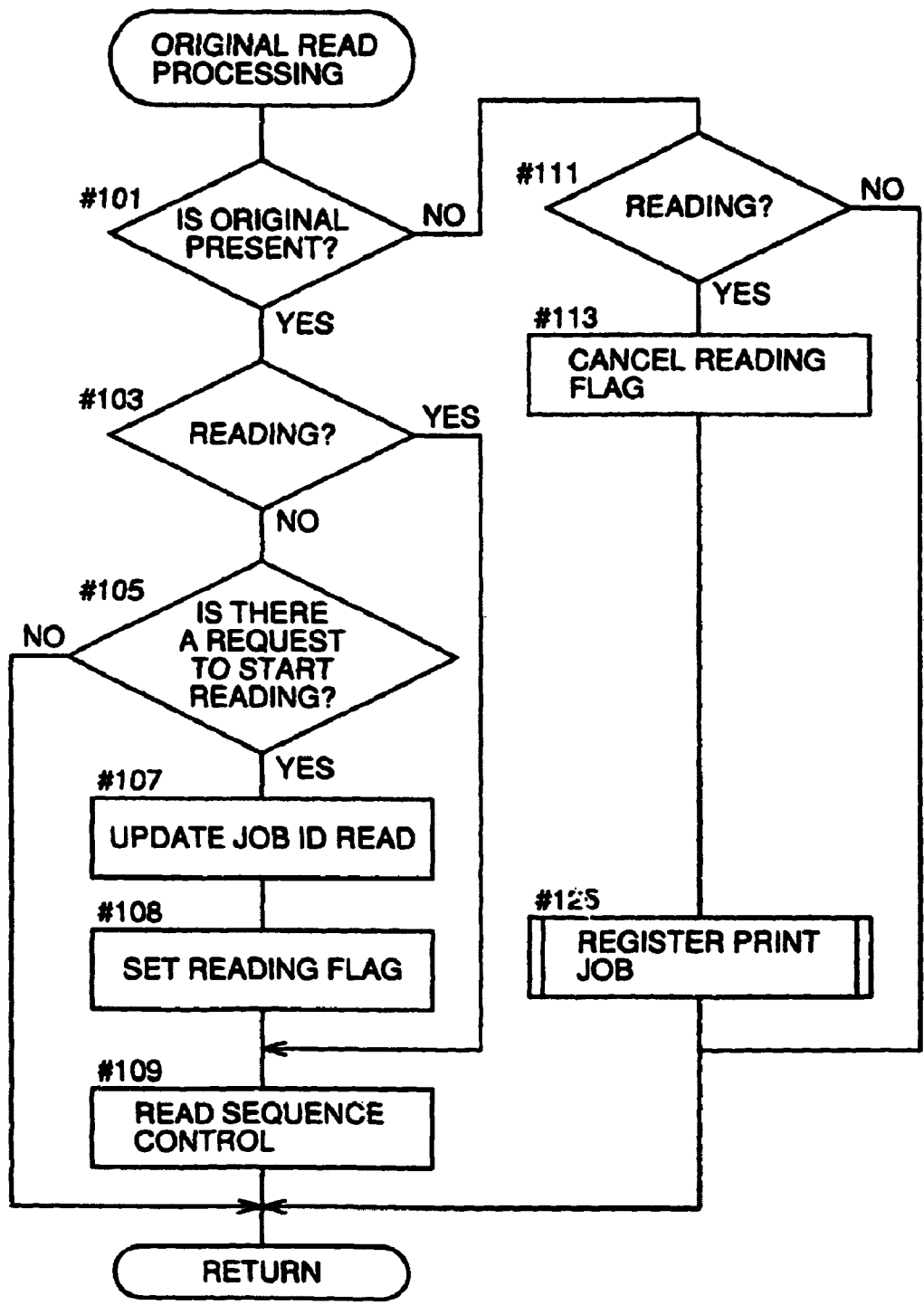
FIG. 13 is a flow chart of a subroutine of the original reading processing.

The original reading processing (#55) shown in FIG. 12 will now be detailed referring to FIG. 13. This routine provides reading of originals by the image reader.

First, CPU 105 checks weather an original is present on original stacker 510 (#101). If any original is present (YES at #101), CPU 105 determines the current reading state (#103). If the original is not being read (NO at #103), CPU 105 inquires of CPU 101 whether a request to start a new original reading has already been received via the start key on operation panel OP (#105). If a request to start the reading is present (YES at #105), CPU 105 updates a job ID number (#107), sets a reading flag for indicating that a reading is being performed (#108), and controls a reading sequence (#109). In the reading sequence control, CPU 105 communicates the aforementioned commands and reports with CPUs 106, 102 and 103 to compress the image data of a plurality of originals for each page and successively register the image data in the aforementioned management table and code memory 303.

The size of an original is detected by the aforementioned original-size sensor SE51, and the information on the detected size of the original is transmitted by the reading sequence control of #109 from CPU 107 to CPU 105.

When an operator sets the original mixed mode, CPU 105 provides the size detection for all originals and the lengths of the originals detected in the main and subscanning directions are registered in the aforementioned management table. When an operator sets the original non-mixed mode, the size detection is provided only for the first original and the sizes of the following originals are not detected and thus the originals are successively read according to the size of the first original.

When there is not a request to start a new original reading from operation panel OP (NO at #105), CPU 105 completes the original reading processing (#55) and successively provides the print processing (#57).

If the current read operation is in a reading state (i.e., if the reading flag is set) (YES at #103), CPU 105 provides the reading sequence control (#109).

When these remain no originals (NO at #101) and the reading flag is still set (YES at #111), CPU 105 determines that the reading of all of the originals has been completed, cancels the reading flag (#113) and provides the print job registration processing described later (#125).

Figure 14:
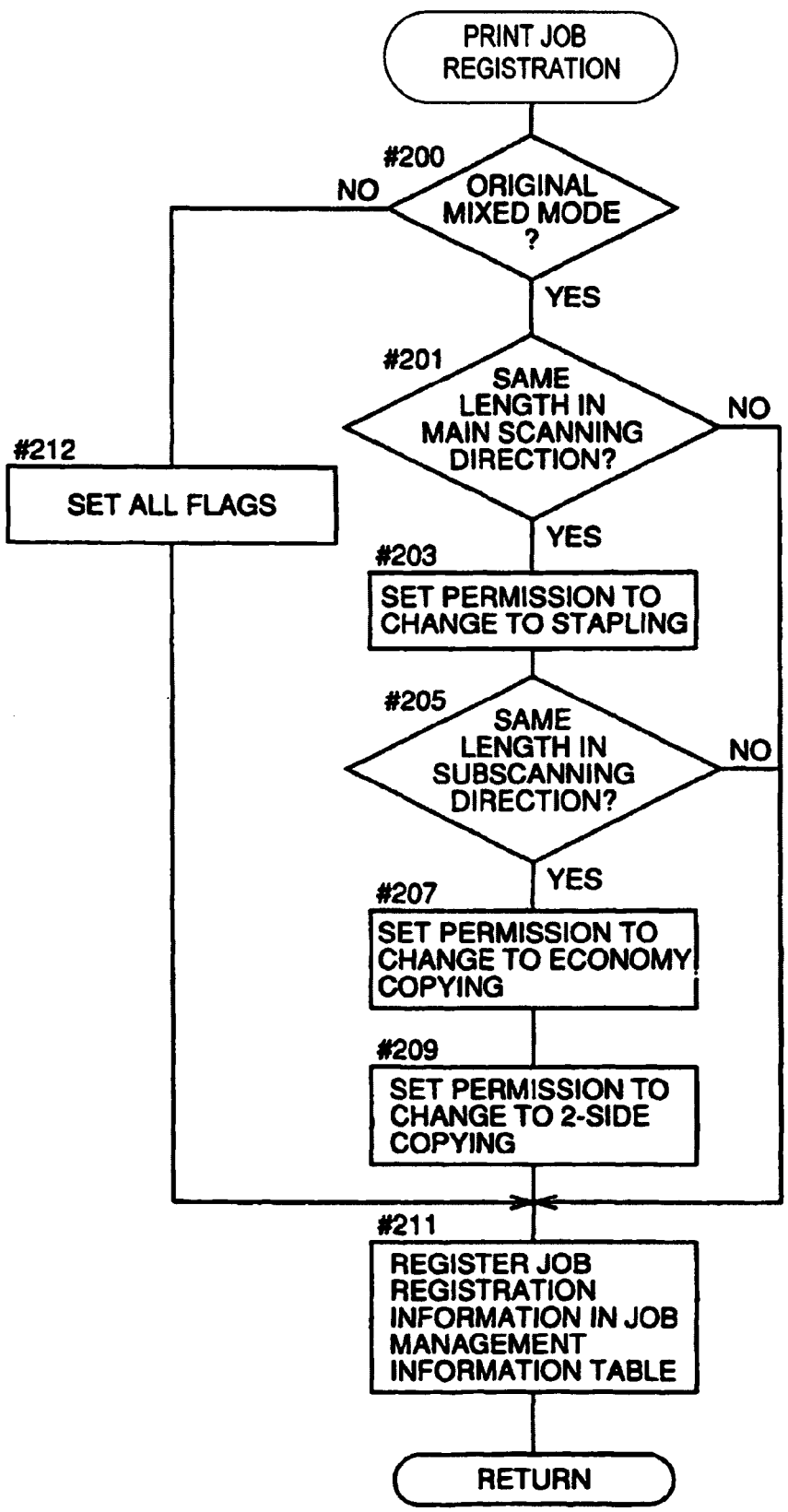
FIG. 14 is a flow chart of a subroutine for print-job registration.

The print job registration (#125) shown in FIG. 13 will now be more specifically described with reference to FIG. 14.

First, CPU 105 determines whether the job for which a reading operation is determined as having been completed at #101 and #111 is set in the original mixed mode or the original non-mixed mode (#200). If it is set in the original mixed mode (YES at #200), CPU 105 determines whether the originals read all have the same size in the processings at #201–205.

As has been described above, the original mixed mode is set by an operator when a plurality of originals includes at least one original which is different in size from the other originals in copying the plurality of originals in one job. However, an operator can inadvertently set the original mixed mode when all originals have the same size, and thus the sizes of originals are determined in the aforementioned processings.

CPU 105 reads the page management information table (T-2) of the management table and determines whether the image data of all read originals have a same length in the main scanning direction (#201). If the data all have the same length in the main scanning direction (YES at #201), print-ing can be executed in the stable print mode while image data having a different length in the subscanning direction is mixed. Thus, CPU 105 sets a flag for providing a permission to change a print mode to the staple print mode (#203). CPU 105 then determines whether the image data of the originals all have a same length in the subscanning direction (#205). If the image data all have a same length in the subscanning direction (YES at #205), the image data of the originals all have a same frame size and a print mode can be changed to the economy print mode and the two-side print mode. Thus, CPU 105 sets a flag for providing a permission to change to economy copying and a flag for providing a permission to change to two-side copying (#207 and #209).

If a mode is the original non-mixed mode (NO at #200), the originals are assumed to all have a same size and CPU 105 sets the flag for providing a permission to change a print mode to the staple print mode, the flag for providing a permission to change to economy copying, and a flag for providing a permission to change to two-side copying (#212).

It should be noted that printing in the one-side print mode can constantly be performed independently of the sizes of originals and thus does not require managing the enabling and disabling of the changes by means of the flags, as is in the other print modes.

Then, CPU 105 registers the information on the above optional print modes into the job management information table (T-1) depending on the states of the flags. CPU 105 also registers in the job management information table (T-1) job registration information indicating that reading is completed for all of originals (#211).

Figure 15:
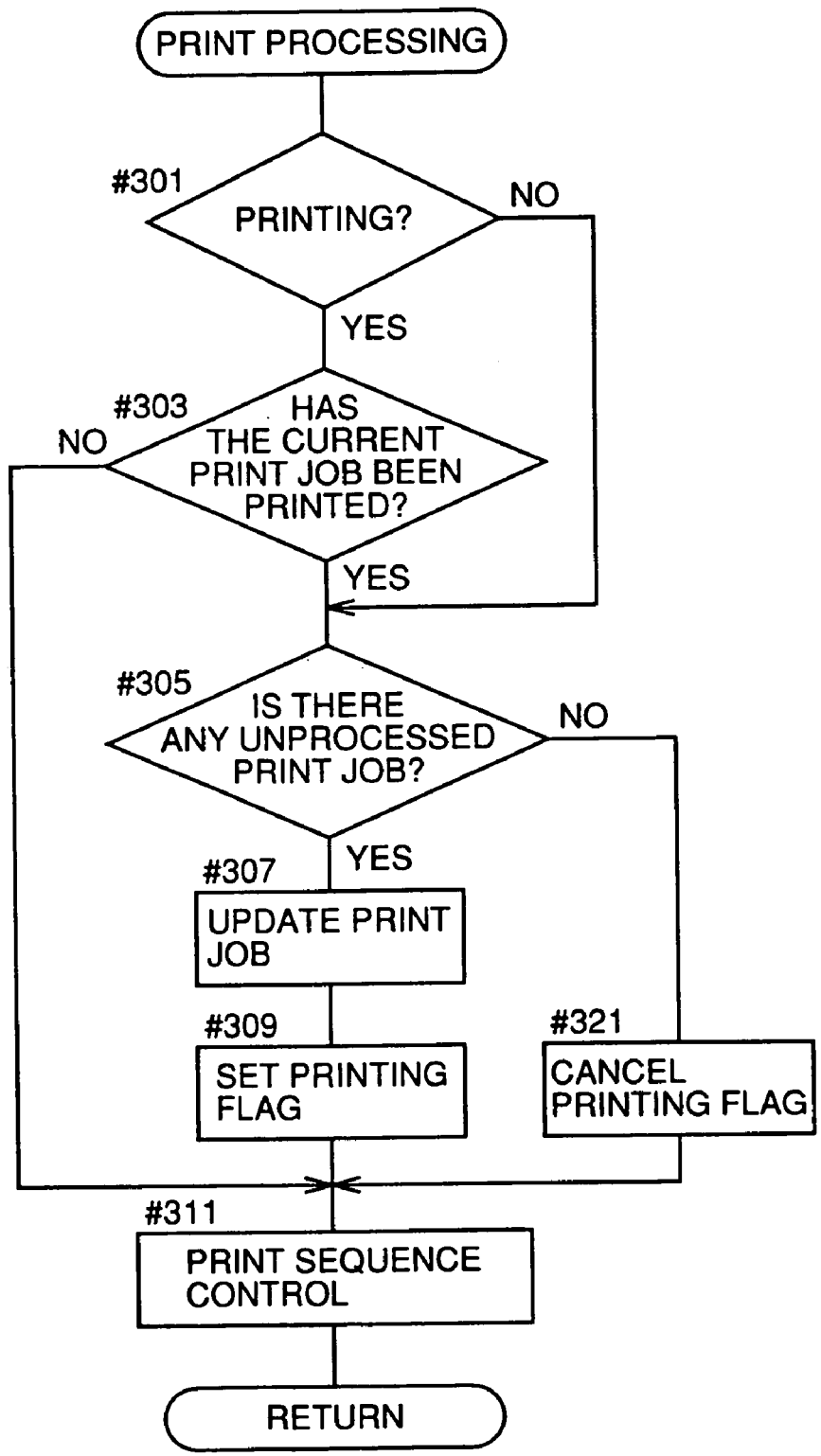
FIG. 15 is a flow chart of a subroutine of the printing processing.

The print processing (#57) shown in FIG. 12 will now be more specifically described with reference to FIG. 15. In this routine, CPU 105 reads image data from code memory 303 and prints the image data.

CPU 105 determines whether printing is being performed (#301). If printing is being performed (YES at #301), CPU 105 determines whether all pages of a print job being currently processed (referred to as "the current print job" hereinafter) have been printed (#303). If the printing is completed (YES at #303), CPU 105 determines based on the information in the management table whether any unprocessed print job is present (#305). If any unprocessed print job is present (YES at #305), CPU 105 updates the current print job (#307) and sets the printing flag which indicates that printing is being performed (#309). If no unprocessed job is present (NO at #305), CPU 105 cancels the printing flag (#321). CPU 105 communicates the aforementioned commands and reports with CPUs 106 and 104 while referring to the aforementioned management table to successively read the image data corresponding to the current print job from code memory 303 for each page and apply the decompression and printing processings to the image data (#311). If the printing of the current print job is not completed (NO at #303), CPU 105 immediately performs the print sequence control (#311). If printing is not being performed (NO at #301), CPU 105 provides the processing of #305 and the subsequent processings.

Figure 11:
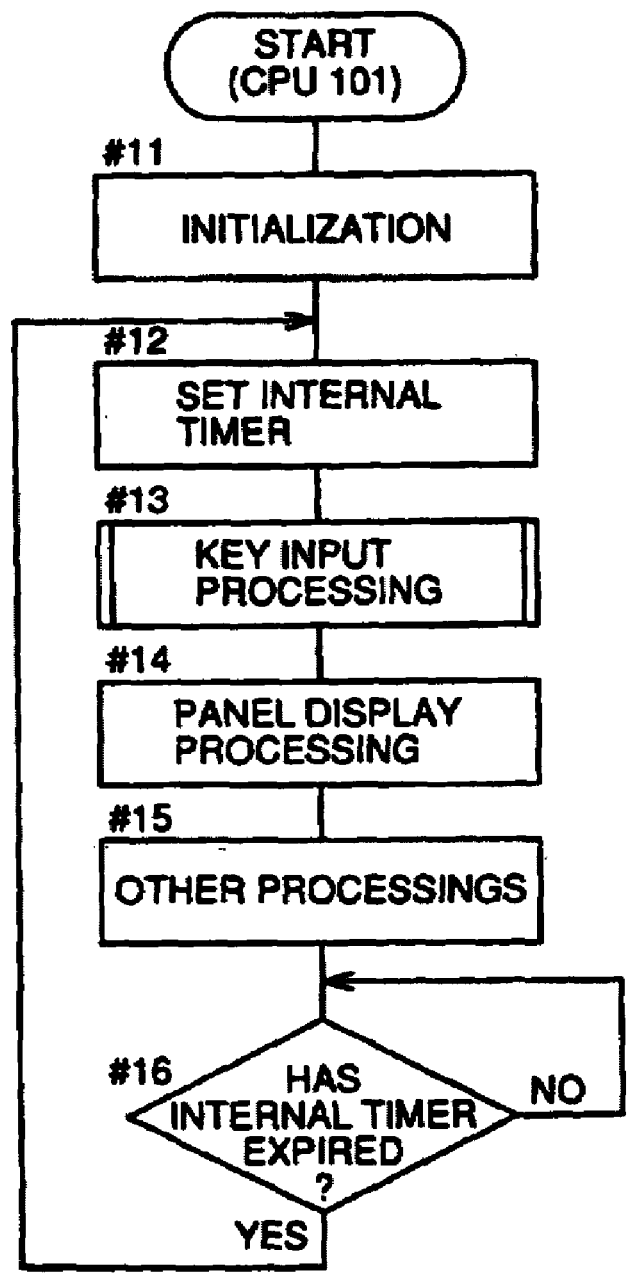
FIG. 11 is a flow chart of the main routine of CPU 101.

Referring to FIG. 16, the key input processing (#13) shown in FIG. 11 will now be more specifically described, which provides the control of the operation panel with respect to mode changing while CPU 101 is in a printing standby state. First, CPU 101 determines whether the current mode is the multijob mode (#401). If it is the multijob mode (YES at #401), CPU 101 determines whether printing is being performed (#403). If printing is being performed (YES at #403), CPU 101 determines whether reading is being performed (#405). If reading is not being performed, any of Q10 shown in FIG. 2 and the screens shown in FIGS. 3A, 3B and 3C is displayed. A description for each of the screens will now be provided.

(1) When the screen which indicates that printing is being performed is displayed (YES at #420, Q10 shown in FIG. 2), CPU 101 determines whether the "CONFIRM" key has been pressed on liquid crystal touch panel 91 (#422). If it has been pressed (YES at #422), CPU 101 reads the job ID number of a job originals for which have all been read and which is registered in the management table (#424) to switch the screen to the job confirmation screen shown in FIG. 3 (#426). Thus, the job ID number of a job for which reading is completed and which is waiting for being printed is displayed on the screen as shown in FIG. 3(A).

(2) When the job confirmation screen is displayed (NO at #420, YES at #430, FIG. 3(A)), CPU 101 determines whether the "RESERVE" key has been pressed on liquid crystal touch panel 91 (#432). If it has been pressed, CPU 101 changes the screen to the reservation screen (FIG. 3(C)) (#434).

If the "CHANGE" key has been pressed (NO at #432, YES at #436), CPU 101 reads any optional print modes from the data in the job management information table to switch the screen to the mode changing screen (#438 and #440). Thus, an optional print mode(s) are displayed on the screen.

(3) When the mode changing screen is displayed (NO at #430, YES at #450, FIG. 3(B)), CPU 101 determines whether any of the touch keys corresponding to optional print modes displayed has been pressed (#452). If any touch key has been pressed (YES at #452), CPU 101 changes the print mode for a job to the print mode corresponding to the pressed touch key and updates the job information management table (#454). In other words, any print modes that cannot be optional are not displayed on the screen. Changing to those print modes is thus prohibited.

CPU 101 also determines whether the "OK" key has been pressed (#456). If it has been pressed, CPU 101 switches the screen to screen Q10 indicating that printing is being performed (#458).

The control of the operation panel on the mode changing screen during printing standby in the multijob mode is provided as described above. On the contrary, when the memory recall mode is selected (NO at #401), the processing for controlling the displaying of the memory recall mode is provided (#401a). The processing is similar to the control of the displaying in the multijob mode (#403–0#458), determining which touch keys are pressed on each screen shown in FIGS. 4(A) and 4(B) and performing mode changing and screen switching according to the decision results. Needless to say, when the "RECALL" key is pressed on the screen shown in FIG. 4(A), CPU 101 reads any optional print modes from the data in the job management information table and displays only the optional print modes on the screen. Changing to the other print modes is thus prohibited.

When the aforementioned processing is completed, CPU 101 provides other input processings by means of the tenkeys (#410), and a processing for switching to other screens (#412).

Thus, the digital copying machine 1 described above allows only optional print modes to be displayed on the screen. This prevents a user from changing a print mode to a print mode which is not optional, reduces operation errors and thus improves the operability of digital copying machine 1.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing device operable in a plurality of modes of operation, comprising:
   a memory for storing pixel density data of a plurality of frames;
   a state decision controller for determining, for each frame, a state of a frame of said pixel density data stored in said memory;
   an operation panel for selecting operable ones of said plurality of modes of operation; and
   a selection prohibiting controller for comparing the state between at least two frames, as determined by the state decision controller, and for automatically prohibiting display and selection of an inoperable mode of operation of said plurality of modes of operation through said operation panel based on the result of said comparison.

2. An image processing device in accordance with claim 1, wherein said state decision controller determines a length of a frame of said pixel density data in a predetermined direction.

3. An image processing device in accordance with claim 1, wherein said state decision controller determines a frame size of said frame of said pixel density data.

4. An image processing device in accordance with claim 1, further comprising:
   a display for displaying an operating state of said image processing device; and
   a display controller, responsive to said selection prohibiting controller, for displaying on said display an operable mode of operation of said plurality of modes of operation.

5. An image forming apparatus operable in a plurality of print modes, comprising:
   a memory for storing pixel density data of a plurality of frames;
   a printer for reading said pixel density data stored in said memory for each frame and for printing;
   a state decision controller for determining, for each frame, a state of a frame of said pixel density data stored in said memory;
   an operation panel for selecting operable ones of said plurality of print modes; and
   a selection prohibiting controller for comparing the state between at least two frames, as determined by the state decision controller, and for automatically prohibiting display and selection of an inoperable print mode of said plurality of print modes through said operation panel based on the result of said comparison.

6. An image forming apparatus in accordance with claim 5, further comprising a finisher for stapling sheets printed by said printer, wherein:
   said state decision controller determines whether said pixel density data stored in said memory includes pixel density data having a frame size different than a frame size of other pixel density data stored in said memory;
   said selection prohibiting controller prohibits selecting a staple print mode through said operation panel when it is determined that said memory includes pixel density data having a frame size different than a frame size of other pixel density data stored in said memory; and
   said staple print mode being provided so that said finisher provides a staple processing.

7. An image forming apparatus in accordance with claim 5, wherein:
said state decision controller determines whether said memory stores said pixel density data different in frame size from other said pixel density data stored in said memory; and
said selection prohibiting controller prohibits selecting a two-side print mode through said operation panel when it is determined that said memory stores said pixel density data different in frame size from other said pixel density data stored in said memory, said two-side print mode being provided for printing said pixel density data stored in said memory on both sides of a sheet.

8. An image forming apparatus in accordance with claim 5, wherein:
said state decision controller determines whether said pixel density data stored in said memory all have a same frame size; and
said selection prohibiting controller prohibits selecting an economy print mode through said operation panel when it is determined that said pixel density data stored in said memory do not all have a same frame size, said economy print mode being provided for printing said pixel density data of a plurality of frames on one same side of a sheet.

9. An image forming apparatus operable in a plurality of print modes, comprising:
a memory for storing a plurality of print jobs, each print job containing pixel density data of at least two frames;
a print-job selector for selecting one of said plurality of print jobs stored in said memory;
a state decision controller for determining, for each frame, a state of a frame of said pixel density data contained in said print job selected by said print-job selector;
a printer for printing said pixel density data contained in said print job selected by said print-job selector;
an operation panel for selecting any of said plurality of print modes; and
a selection prohibiting controller for comparing the state between at least two frames, as determined by the state decision controller, and for automatically prohibiting selecting an inoperable print mode of said plurality of print modes through said operation panel based on the result of said comparison.

10. An image forming apparatus in accordance with claim 9, further comprising a finisher for stapling sheets printed by said printer;
wherein said print job selected by said print-job selector contains pixel density data of a plurality of frames and said state decision controller determines whether said print job selected by said print-job selector contains pixel density data having a frame size different than a frame size of other pixel density data contained in said print job selected by said print-job selector; and
wherein said selection prohibiting controller prohibits selecting a staple print mode through said operation panel when it is determined that said print job selected by said print-job selector contains pixel density data having a frame size different than a frame size of other pixel density data contained in said print job selected by said print-job selector, said staple print mode being provided so that said finisher provides a staple processing.

11. An image forming apparatus in accordance with claim 9, wherein said print job selected by said print-job selector contains pixel density data of a plurality of frames and said state decision controller determines whether said print job selected by said print-job selector includes pixel density data having a frame size different than a frame size of other pixel density data contained in said print job selected by said print-job selector; and
wherein said selection prohibiting controller prohibits selecting a two-side print mode through said operation panel when it is determined that said print job selected by said print-job selector includes pixel density data having a frame size different than a frame size of other pixel density data contained in said print job selected by said print-job selector, said two-side print mode being provided for printing said pixel density data on both sides of a sheet.

12. An image forming apparatus in accordance with claim 9, wherein said print job selected by said print-job selector contains pixel density data of a plurality of frames and said state decision controller determines whether said pixel density data contained in said print job selected by said print-job selector all have a same frame size; and
wherein said selection prohibiting controller prohibits selecting an economy print mode through said operation panel when it is determined that said pixel density data contained in said print-job selected by said print-job selector do not all have a same frame size, said economy print mode being provided for printing said pixel density data of a plurality of frames on same one side of a sheet.

13. An image processing device operable in a plurality of modes of operation, comprising:
a memory for storing pixel density data of a plurality of frames;
a state decision controller for determining, for each frame, a state of a frame of said pixel density data stored in said memory;
a selection prohibiting controller, responsive to said state decision controller, for comparing the state between at least two frames, as determined by the state decision controller, and for determining an inoperable mode of operation of said plurality of modes of operation based on the result of said comparison; and
an operation panel, responsive to said selection prohibiting controller, for displaying operable ones of said plurality of modes of operation for selection, said operation panel automatically prohibiting displaying and selecting said thus determined inoperable mode of operation.

14. An image processing device in accordance with claim 13, wherein said state of said frame of said pixel density data determined by said state decision controller for each frame thereof is a frame size.

15. An image processing device in accordance with claim 14, wherein said plurality of modes of operation include at least one of economy print mode, two-side print mode, and staple print mode.

* * * * *